United States Patent
Hwang et al.

(10) Patent No.: US 6,528,905 B1
(45) Date of Patent: Mar. 4, 2003

(54) COOLING APPARATUS FOR AN XY GANTRY

(75) Inventors: Ji Hyun Hwang; Do Hyun Kim; Hyun Joo Hwang, all of Kyungki-d0; Jang Sung Chun, Seoul, all of (KR)

(73) Assignee: Mirae Corporation, Choongchungnam-do (KR)

(*) Notice: Subject to any disclaimer, the term of this patent is extended or adjusted under 35 U.S.C. 154(b) by 0 days.

(21) Appl. No.: 09/586,795

(22) Filed: Jun. 5, 2000

(30) Foreign Application Priority Data

Aug. 13, 1999 (KR) ................ 1999-33441

(51) Int. Cl.[7] ............... H02K 41/00; H02K 9/02
(52) U.S. Cl. ........................... 310/12
(58) Field of Search ............... 310/12, 52, 58

(56) References Cited

U.S. PATENT DOCUMENTS

| | | | | | |
|---|---|---|---|---|---|
| 3,852,627 A | * | 12/1974 | Davis | ........ | 310/13 |
| 4,836,111 A | * | 6/1989 | Kaufmann | ........ | 104/89 |
| 5,703,420 A | * | 12/1997 | Kamata et al. | ........ | 310/54 |
| 5,834,862 A | * | 10/1998 | Hartzell, Jr. | ........ | 310/12 |
| 5,886,433 A | * | 3/1999 | Oda et al. | ........ | 310/59 |
| 6,089,262 A | * | 7/2000 | Hart | ........ | 137/543.21 |

FOREIGN PATENT DOCUMENTS

JP 405162040 A * 6/1993

* cited by examiner

Primary Examiner—Tran Nguyen
Assistant Examiner—Judson H. Jones
(74) Attorney, Agent, or Firm—Fleshner & Kim, LLP

(57) ABSTRACT

The present invention relates to a cooling apparatus for an XY gantray, and more particularly to a cooling apparatus which cools an X-axis and Y-axis linear motors used when linear motors are employed for the XY gantry adapted to travel on the plane to perform works. The cooling apparatus for the XY gantry comprises: the X-axis and Y-axis linear motors having respective stator element and moving element, the stator element and moving element having through-holes formed in one side thereof so that external air is introduced therethrough to flow along surface of coil blocks included in the respective moving element of the X-axis and Y-axis linear motors, thereby cooling heat generated from the coil blocks. An advantage is provided in that heat generated from each of the coil blocks can be cooled by air flowing through the air passages provided by respective through-holes of the X- and Y-axis linear motors applied to the XY gantry.

43 Claims, 6 Drawing Sheets

COOLING APPARATUS FOR AN XY GANTRY

BACKGROUND OF THE INVENTION

1. Field of the Invention

The present invention relates to a cooling apparatus for an XY gantry, and more particularly to a cooling apparatus which cools an X-axis and Y-axis linear motors used when linear motors are employed for the XY gantry adapted to travel on the plane to perform works.

2. Description of the Conventional Art

An XY gantry is used in various kinds of machine tools, parts assembling apparatus, etc., which travel on the plane defined by an X-axis and Y-axis for performing predetermined works. For example, the XY gantry is used in high-speed, accurate surface mounting apparatus for performing picking up and transferring of the parts and accurately guiding the moved parts to a printed circuit board (PCB) for their surface mounting.

With reference to the accompanying drawings, the XY gantry will be explained which guides in traveling on the X-Y plane. FIG. 1 is a perspective view of the XY gantry. As shown in FIG. 1, the XY gantry includes an X-axis linear motor 10 and a Y-axis linear motor 20. The Y-axis linear motor 20 is disposed to travel along the Y-axis in the plane. The X-axis linear motor 10 disposed on a frame 30 bridging two Y-axis linear motors 20 travels along the X-axis in the plane to be moved to a predetermined position designated on the plane. The X-axis and Y-axis linear motors 10, 20 which are moved to the designated position on the plane consist of stator elements 11, 21 and moving elements 12, 22, respectively.

The stator elements 11, 21 have a plurality of permanent magnets 11a, 21a arranged inside U-shaped frames 11b, 21b, while the moving elements 12, 22 have armature frames 12b, 22b and coil blocks 12a, 22a.

The X-axis and Y-axis linear motors 10, 20 provide propelling power generated between the coil blocks 12a, 22a and each of the plurality of permanent magnets 11a, 21a, when a current is supplied to each of the coil blocks 12a, 22a. The propelling power allows the moving elements 12, 22 to be moved to the position designated on the plane defined by the X-axis and Y-axis.

In case the conventional XY gantry employs the X-axis and Y-axis linear motors 10, 20, the supply of a current into each of the coil blocks 12a, 22a is needed to be moved to the designated position along the X-axis and Y-axis in the plane. A large amount of heat is generated from the coil blocks 12a, 22a to which the current is supplied.

There occurred problems in that heat generated from each of the coil blocks 12a, 22a constituting the X-axis and Y-axis linear motors 10, 20 weakens the propelling power of each of moving elements 12, 22, or further causes malfunction of devices (not shown) for driving the linear motors.

SUMMARY OF THE INVENTION

Therefore, it is an object of the present invention to solve problems mentioned above, by providing a cooling apparatus for cooling heat generated from coil blocks by using air introduced through a plurality of through-holes formed in X-axis and Y-axis liner motor employed in a XY gantry which travels on a plane defined by an X-axis and Y-axis to perform predetermined works.

To accomplish an object of the present invention, a cooling apparatus for the XY gantry is provided which comprises: X-axis and Y-axis linear motors having respective stator element and moving element, the stator element and moving element having through-holes formed in one side thereof so that external air is introduced therethrough to flow along surface of coil blocks included in the respective moving element of the X-axis and Y-axis linear motors, thereby cooling heat generated from the coil blocks.

According to the present invention, an advantage is provided in that heat generated from each of the coil blocks can be cooled by air flowing through the air passages provided by respective through-holes of the X- and Y-axis linear motors applied to the XY gantry,

BRIEF DESCRIPTION OF THE DRAWINGS

FIGS. 5 and 5A are perspective views of a Y-axis linear motor shown in FIG. 2.

DETAILED DESCRIPTION OF THE INVENTION

With reference to the accompanying drawings, a cooling apparatus for an XY gantry according to the present invention will be described below.

Figure 1:
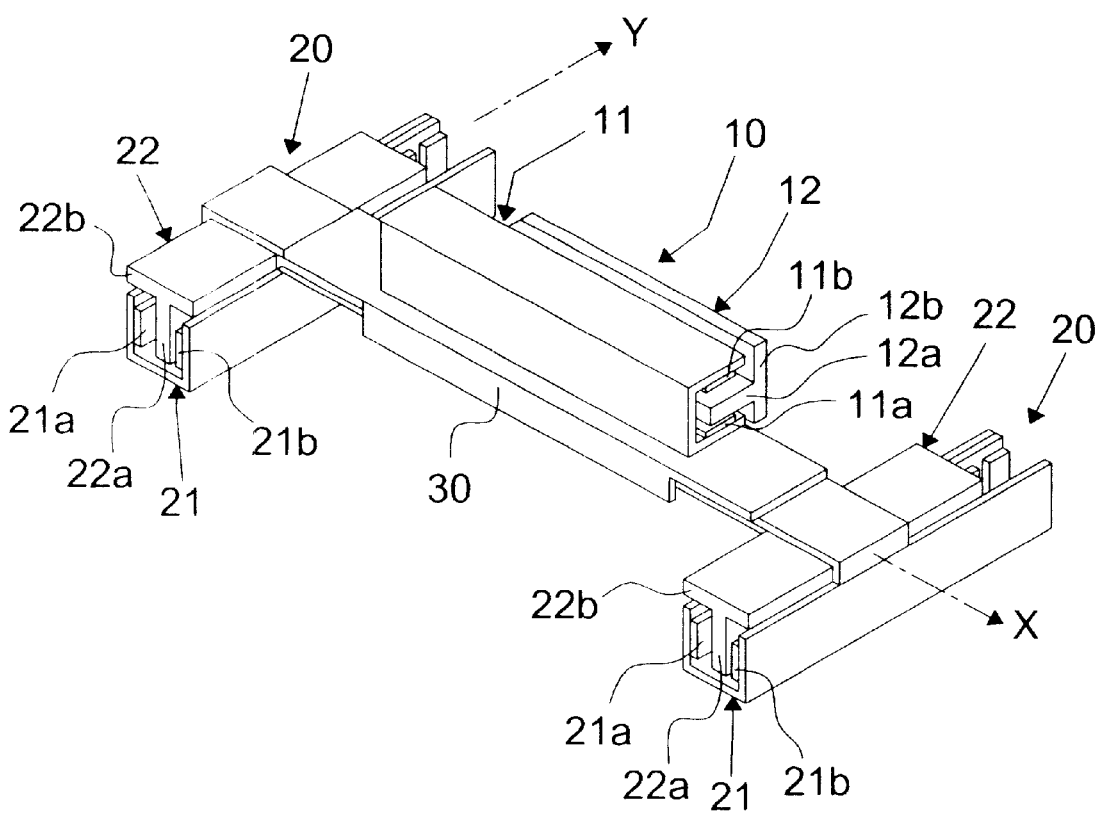
FIG. 1 is a perspective view of an XY gantry.
Figure 2:
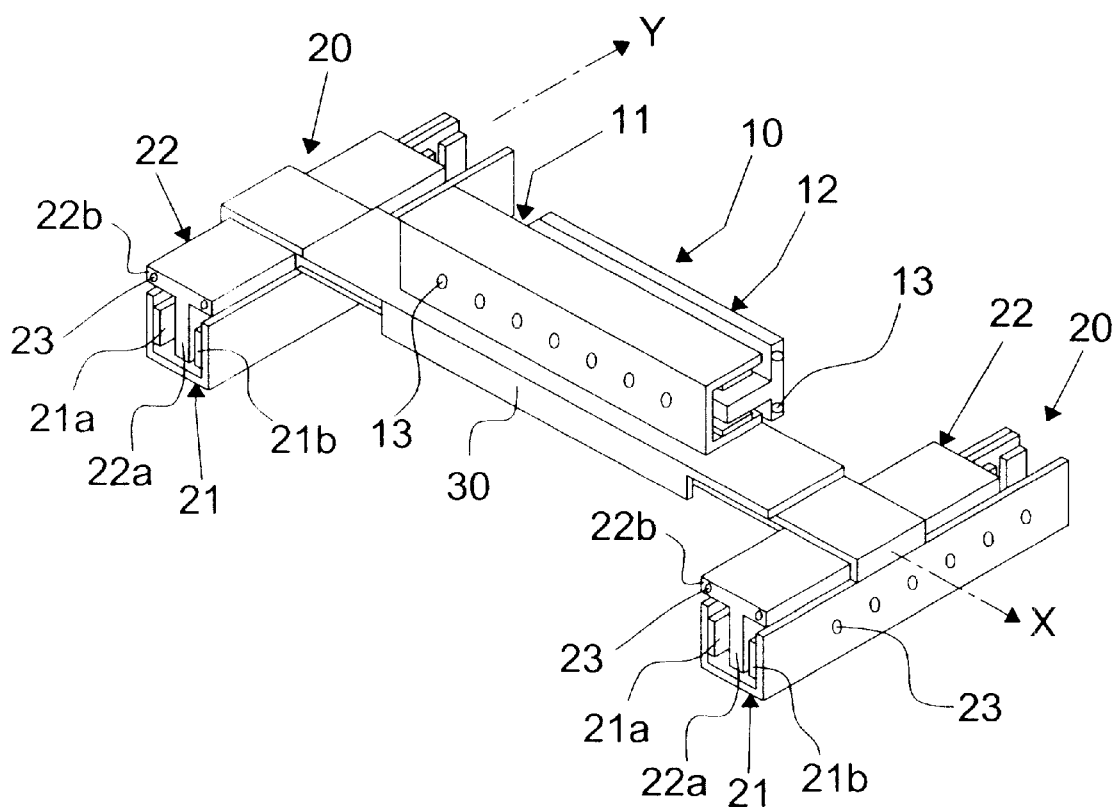
FIG. 2 is a perspective view of the XY gantry according to the present invention.
Figure 3:
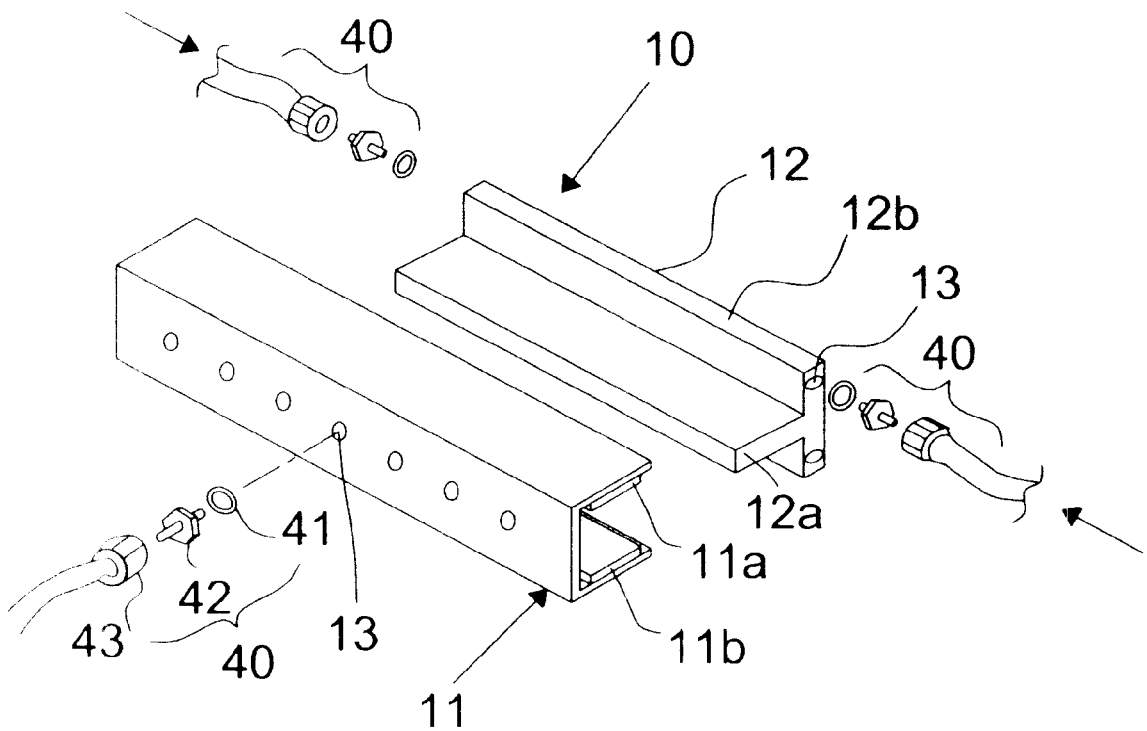
FIG. 3 a perspective view of an X-axis linear motor shown in FIG. 2.
Figure 4:
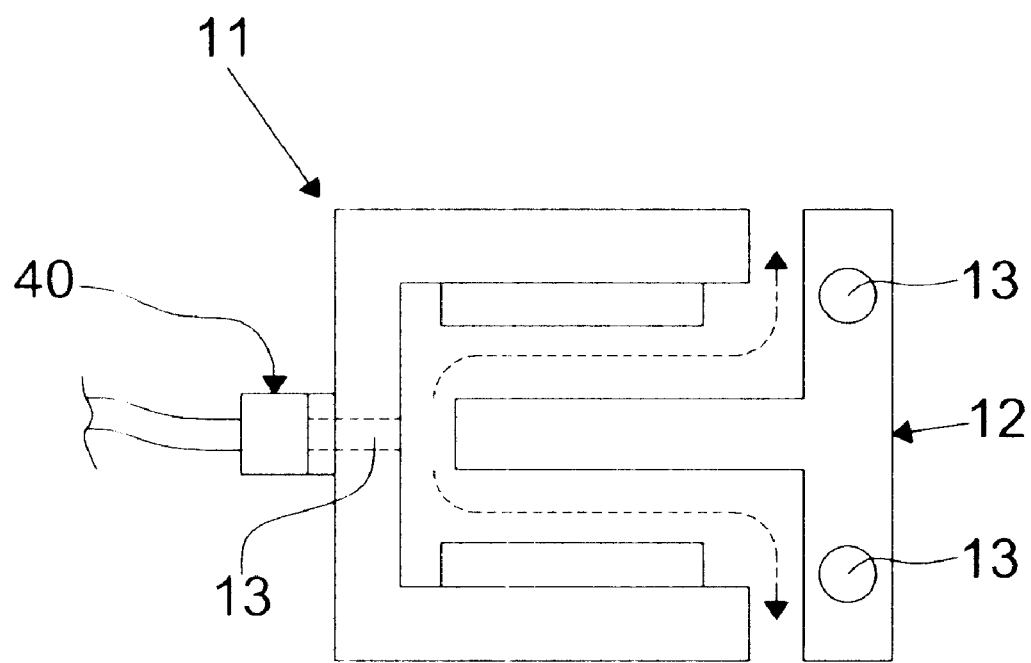
FIG. 4 is a front sectional view of the X-axis linear motor shown in FIG. 3.
Figure 5:
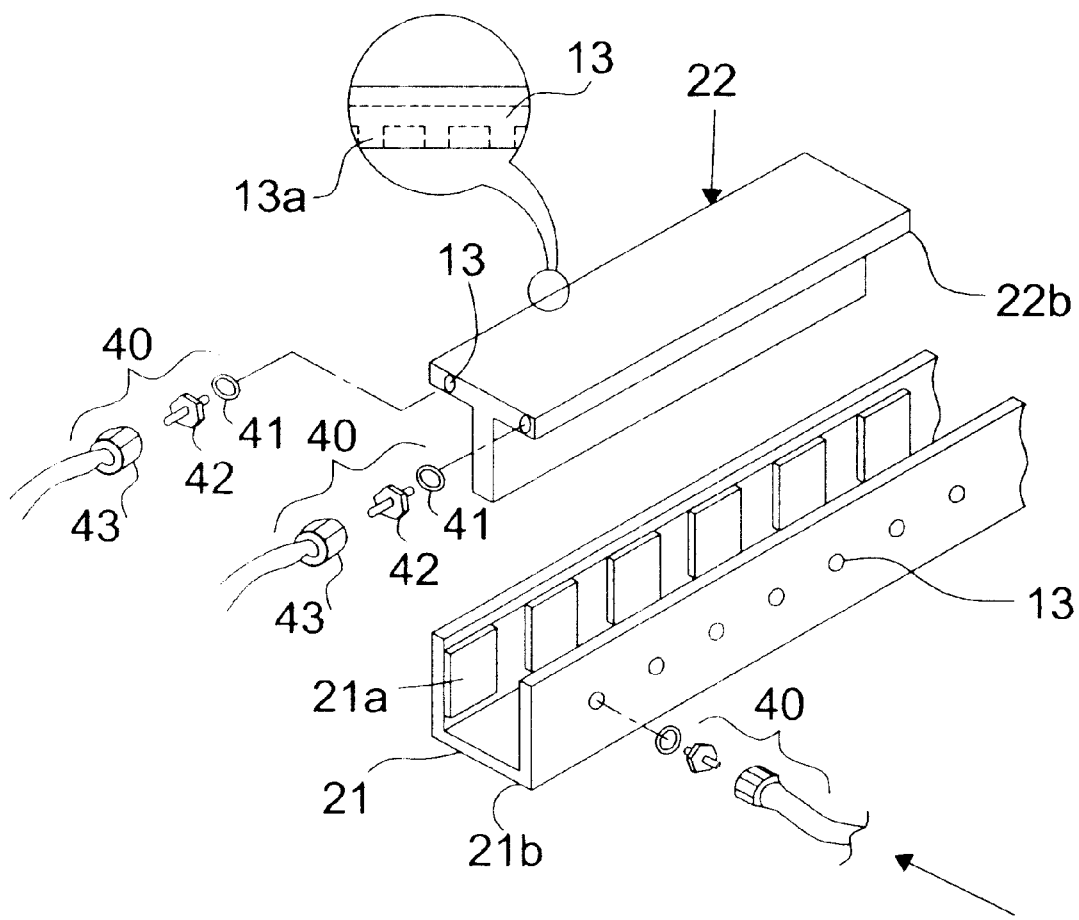
Figure 6:
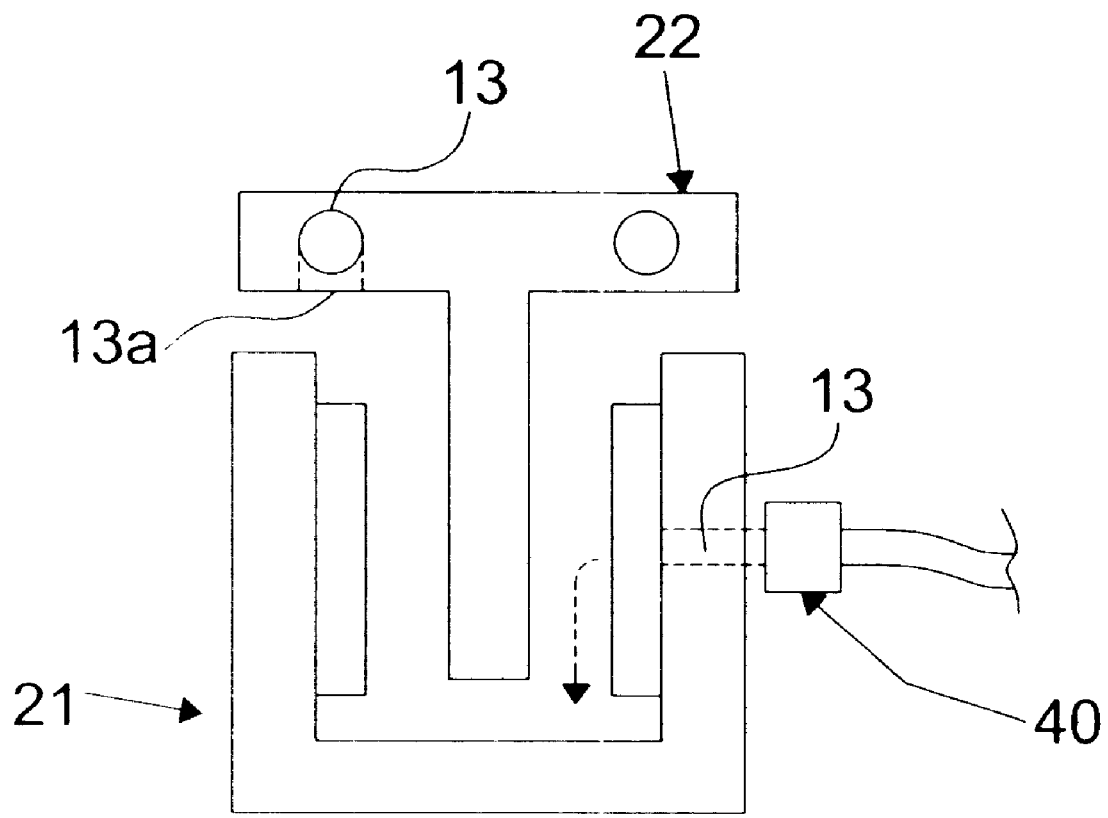
FIG. 6 is a front sectional view of the Y-axis linear motor shown in FIG. 5.

FIG. 2 is a perspective view of the XY gantry according to the present invention, FIG. 3 a perspective view of an X-axis linear motor shown in FIG. 2, FIG. 4 is a front sectional view of the X-axis linear motor shown in FIG. 3, FIG. 5 a perspective view of a Y-axis linear motor shown in FIG. 2, and FIG. 6 is a front sectional view of the Y-axis linear motor shown in FIG. 5.

As shown in FIG. 2, the cooling apparatus in accordance with the present invention comprises X-axis and Y-axis linear motors 10, 20 having respective stator elements 11, 21 and the moving elements 12, 22 whose sides have, respectively, the through-holes 13, 23 so that external air is introduced therethrough to flow along surfaces of coil blocks 12a, 22a of the moving elements 12, 22, thereby cooling heat generated from the coil blocks 12a, 22a.

In the meantime, for the XY gantry consisting of the X-axis linear motor 10 and the Y-axis linear motor 20, the X-axis linear motor 10 is disposed on a frame 30 placed in an X axial direction, bridging two Y-axis linear motors 20. As the X-axis linear motor 10 coupled to the frame 30 and Y-axis linear motor 20 travel along respective axes on the plane, heat is generated from respective coil blocks 12a, 22a. Heat has to be cooled by the through-holes 13, 23.

External air introduced through the through-holes 13, 23 flows inside the X- and Y-axis linear motors 10, 20 to cool heat generated from the respective coil blocks 12a, 22a. Among the X- and Y-axis linear motors 10, 20 adapted to cool the coil blocks 12a 22a by using the introduced air, the X-axis linear motor will be described with reference to the accompanying drawings.

FIG. 3 is a perspective view of an X-axis linear motor shown in FIG. 2, and FIG. 4 is a front sectional view of the X-axis linear motor shown in FIG. 3.

As shown in these drawings, the through-holes 13 are arranged at a predetermined spacing in one side of the stator element 11 of the X-axis linear motor 10. The through-holes in the stator element 11 are formed to perforate one side of a U-shaped frame 11b where permanent magnet 11a is not installed, whereas the through-hole 13 in the moving element 12 is formed to perforate the armature frame 12b from one end to the other end thereof.

The moving element side through-hole of the X-axis linear motor 10 forms an air passage which functions to block the heat transfer from the coil blocks 12a to the armature frame 12b.

To prevent the armature frame 12b, or machine parts or devices (not shown) attached to the armature frame 12b from being deformed due to heat generated from the coil blocks 12a, the air passage is formed to introduce air to cool heat, and extends from one end to the other end of the armature frame 12b for a uniform cooling effect.

Also, the stator element side through-holes 13 introduce external air to flow along both side surfaces of the coil blocks 12b in directions indicated by the arrows in FIG. 4, thereby to cool heat generated from the coil blocks 12b. At this time, to enhance the cooling efficiency, the stator element side through-holes 13 may be collectively arranged around sites where the moving element 12 is frequently positioned.

An air flow valve coupling unit 40 is further provided for introducing air into the through-holes 13 formed in the stator element 11 and moving element 12 in order to cool heat generated from the coil blocks 12b. The air flow valve coupling unit 40 may consist of an O-ring 41 made of rubber material, and an air valve 42 for connecting the through-holes 13 and a rubber tube 43.

In this case, the air valve 42 installed in the stator element 11 may be a solenoid valve which enables an adjustment of an air flow rate or an ON/OFF of the air flow. The solenoid valve is controlled to be on/off at the position of the moving element 12 moved, under the control of a controller (not shown) based upon said position of the moving element 12.

The cooling efficiency is further enhanced by turing ON the solenoid valve disposed corresponding to the position where the moving element 12 becomes positioned.

In the meantime, the stator element 21 and moving element 22 of the Y-axis linear motor 20 also has an air flow valve coupling unit 30 including an air valve 42, similarly to that of the X-axis linear motor 20, the details of which will be explained with reference to FIGS. 5 and 6.

As shown in FIG. 5, the stator element 21 has the through-holes 13 formed in sides thereof not supported by a machine frame (not shown), wherein the through-holes 13 may be collectively arranged at specific sites in relation to the position of the moving element 22. Further, the solenoid valves which can control the air valve 42 are used to enhance the cooling efficiency by collectively turning ON/OFF the solenoid valves 42 positioned corresponding to the position where the moving element 12 becomes positioned, based upon the recognition of the position of the moving element 22 moved.

Moreover, the through-holes 13 formed in the moving element 22 of the Y-axis linear motor 20 are formed to perforate both ends of the armature element frame 22b, one through-hole of two holes 13 having one end thereof blocked and being connected to a plurality of through-holes 13 formed in a lower part of the armature element frame 22b. By such a construction, external air is introduced through the through-holes 13 in directions indicated by the arrow in FIG. 6, thereby cooling heat generated from the coil blocks 22a.

Thus, heat generated from each of the coil blocks can be cooled by air flowing through the air passages provided by respective through-holes of the X- and Y-axis linear motors applied to the XY gantry, and further, with the use of the solenoid valves, the cooling efficiency can be improved by selectively making it ON/OFF the air flow according to the position of the respective moving elements.

According to the foregoing, an advantage is provided in that heat generated from each of the coil blocks can be cooled by air flowing through the air passages provided by respective through-holes of the x- and y-axis linear motors applied to the XY gantry,

What is claimed is:

1. For an XY gantry including an X-axis linear motor and a Y-axis linear motor, a cooling apparatus comprising:
   through-holes formed in moving elements of the X-axis and Y-axis linear motors so that external air is introduced therethrough, thereby cooling heat generated from coil blocks of the linear motors, wherein the through-holes each have a portion having a longitudinal axis that is parallel to respective longitudinal axes of the moving elements.

2. The apparatus as defined in claim 1, wherein the through-holes are arranged with a predetermined spacing in at least one side of at least one of the respective stator element and moving element of the motors, or are collectively arranged at specific sites.

3. The apparatus as defined in claim 1, further comprising at least one air valve for introducing air from external source into at least one corresponding through-hole.

4. The apparatus as defined in claim 3, wherein at least one air valve comprises a solenoid valve used to turn ON/OFF an air flow introduced through the at least one corresponding through-hole.

5. The apparatus as defined in claim 1, further comprising at least one air flow valve coupling unit coupled to a corresponding one of the through-holes, the air flow valve coupling unit comprising an O-ring, an air valve, and an air passage connecting the air valve to an external source of air.

6. The apparatus as claimed in claim 1, wherein through-holes are formed in both the moving elements and the stator elements of the X-axis and Y-axis linear motors.

7. The apparatus as claimed in claim 6, wherein the through-holes are arranged with a predetermined spacing in at least one side of the respective stator elements and moving elements, or are collectively arranged at specific sites.

8. A cooling apparatus for a linear motor having a stator element and a moving element, comprising:
   at least one through-hole formed in each of the stator element and the moving element of the linear motor and configured so that external air is introduced therethrough, to thereby cool heat generated from a coil block of the linear motor, wherein the at least one through-hole formed in the moving element includes a portion having a longitudinal axis that is parallel to a longitudinal axis of the moving element.

9. The cooling apparatus as claimed in claim 8, wherein a plurality of through-holes are formed in each of the stator element and the moving element.

10. The cooling apparatus as claimed in claim 9, wherein the plurality of through-holes are arranged with a predetermined spacing in one side of the stator element and the moving element.

11. The cooling apparatus as claimed in claim 9, wherein the plurality of through-holes are arranged at at least one specific position on the stator element and the moving element.

12. The cooling apparatus as claimed in claim 8, further comprising an air valve for introducing air from an external source into at least one of the through-holes.

13. The cooling apparatus as claimed in claim 12, wherein the air valve comprises a solenoid valve configured to turn ON/OFF an air flow introduced through the at least one through-hole.

14. The cooling apparatus as claimed in claim 8, further comprising an air flow valve coupling unit coupled to at least one of the through-holes, the air flow valve coupling unit comprising an air valve, and an air conduit connecting the air valve to an external source of air.

15. The cooling apparatus as claimed in claim 8, further comprising an air valve coupled to the at least one through-hole in the moving element, wherein the air valve is configured to selectively introduce cooling air from an air source into the at least one through-hole.

16. The cooling apparatus as claimed in claim 8, wherein the at least one through-hole in the moving element includes a plurality of apertures spaced along the longitudinal axis of the moving element.

17. The cooling apparatus as claimed in claim 8, wherein the at least one through-hole in the stator motor comprises a plurality of through-holes in the stator of the linear motor, and the cooling apparatus further comprises a plurality of air valves, wherein each of the air valves is coupled to a corresponding one of the plurality of through-holes and is configured to selectively introduce air into its corresponding through-hole, and wherein the cooling apparatus is configured to selectively activate the plurality of air valves such that air is admitted into only the through-holes that are adjacent to the moving element.

18. An XY gantry, comprising:
a linear motor having a stator element and a moving element; and
at least one through-hole formed in each of the stator element and the moving element of the linear motor so that external air is introduced therethrough, wherein the at least one through-hole formed in the moving element has a portion having a longitudinal axis that is parallel to a longitudinal axis of the moving element.

19. The XY gantry as claimed in claim 18, wherein a plurality of through-holes are formed in each of the stator element and the moving element.

20. The XY gantry as claimed in claim 19, wherein the plurality of through-holes are arranged with a predetermined spacing on the stator element and the moving element.

21. The XY gantry as claimed in claim 19, wherein the plurality of through-holes are collectively arranged at at least one specific position.

22. The XY gantry as claimed in claim 18, further comprising at least one air valve coupled the at least one of the through-holes for introducing air into the at least one through-hole from an external source.

23. The XY gantry as claimed in claim 18, further comprising an air flow valve coupling unit coupled to the at least one of the through-holes, the air flow valve coupling unit comprising an air valve, an air conduit connecting the air valve to an external source of air.

24. The XY gantry as claimed in claim 18, wherein the at least one through-hole in the moving element includes a plurality of apertures spaced along the longitudinal axis of the moving element.

25. The XY gantry as claimed in claim 18, wherein the at least one through-hole in the stator element comprises a plurality of through-holes in the stator element of the linear motor, and the XY gantry further comprising a plurality of air valves, wherein each of the air valves is coupled to a corresponding one of the plurality through-holes and is configured to selectively introduce air into its corresponding through-hole, and wherein the plurality of air valves are configured to be selectively activated such that air is admitted into only the through-holes that are adjacent to the moving element.

26. A cooling apparatus for a linear motor having a stator element and a moving element, comprising:
at least one through-hole formed in at least one of the stator element and the moving element of the linear motor and configured so that external air is introduced therethrough to thereby cool heat generated from a coil block of the linear motor, wherein the at least one through-hole is located in the moving element and a portion of the at least one through-hole has a longitudinal axis that is parallel to a longitudinal axis of the moving element.

27. The cooling apparatus as claimed in claim 26, further comprising an air valve coupled to the at least one through-hole in the moving element, wherein the air valve is configured to selectively introduce cooling air from an air source into the at least one through-hole.

28. The cooling apparatus as claimed in claim 26, wherein the at least one through-hole in the moving element includes a plurality of apertures spaced along the longitudinal axis of the moving element.

29. The cooling apparatus as claimed in claim 26, wherein the at least one through-hole comprises a plurality of through-holes.

30. The cooling apparatus as claimed in claim 29, wherein the plurality of through-holes are arranged with a predetermined spacing in one side of the moving element.

31. The cooling apparatus as claimed in claim 29, wherein the plurality of through-holes are arranged at at least one specific position on the moving element.

32. The cooling apparatus as claimed in claim 26, further comprising an air valve for introducing air from an external source into the at least one through-hole.

33. The cooling apparatus as claimed in claim 32, wherein the air valve comprises a solenoid valve configured to turn ON/OFF an air flow introduced through the at least one through-hole.

34. The cooling apparatus as claimed in claim 26, further comprising an air flow valve coupling unit coupled to the at least one through-hole, the air flow valve coupling unit comprising an air valve, and an air conduit connecting the air valve to an external source of air.

35. A cooling apparatus for a linear motor having a stator element and a moving element, comprising:
at least one through-hole formed in each of the stator element and the moving element of the linear motor and configured so that external air is introduced therethrough, to thereby cool heat generated in a coil block of the linear motor, wherein the at least one through-hole formed in the stator element comprises a plurality of through-holes in the stator element of the linear motor, and further comprising a plurality of air valves, wherein each of the air valves is coupled to a corresponding one of the plurality through-holes and is configured to selectively introduce air into its corresponding through-hole, and the cooling apparatus is configured to selectively activate the plurality of air valves such that air is admitted into only the through-holes that are adjacent to the moving element, and wherein the at least one through-hole formed in the moving element has a portion having a longitudinal axis that is parallel to a longitudinal axis of the moving element.

36. An XY gantry, comprising:
a linear motor having a stator element and a moving element; and
at least one through-hole formed in the moving element of the linear motor so that external air is introduced therethrough to cool a coil block of the linear motor, wherein a portion of the at least one through-hole has a longitudinal axis that is parallel to a longitudinal axis of the moving element.

37. The XY gantry as claimed in claim 36, wherein the at least one through-hole in the moving element includes a plurality of apertures spaced along the longitudinal axis of the moving element.

38. The cooling apparatus as claimed in claim 36, wherein the plurality of through-holes are arranged with a predetermined spacing in one side of the moving element.

39. The cooling apparatus as claimed in claim 36, wherein the plurality of through-holes are arranged at at least one specific position on the moving element.

40. The cooling apparatus as claimed in claim 36, further comprising an air valve for introducing air from an external source into the at least one through-hole.

41. The cooling apparatus as claimed in claim 40, wherein the air valve comprises a solenoid valve configured to turn ON/OFF an air flow introduced through the at least one through-hole.

42. The cooling apparatus as claimed in claim 41, further comprising an air flow valve coupling unit coupled to the at least one through-hole, the air flow valve coupling unit comprising an air valve, and an air conduit connecting the air valve to an external source of air.

43. An XY gantry, comprising:
a linear motor having a stator element and a moving element; and
at least one through-hole formed in each of the stator element and the moving element of the linear motor so that external air is introduced therethrough to cool a coil block of the linear motor, wherein the at least one through-hole in the stator element comprises a plurality of through-holes in the stator element of the linear motor, and further comprising a plurality of air valves, wherein each of the air valves is coupled to a corresponding one of the plurality through-holes and is configured to selectively introduce air into its corresponding through-hole, and the plurality of air valves are configured to be selectively activated such that air is admitted into only the through-holes that are adjacent to the moving element and wherein the at least one through-hole formed in the moving element includes a portion having a longitudinal axis that is parallel to a longitudinal axis of the moving element.

* * * * *